(12) United States Patent
Aubrey

(10) Patent No.: US 8,486,176 B2
(45) Date of Patent: Jul. 16, 2013

(54) METHOD FOR FILTERING MOLTEN ALUMINUM AND MOLTEN ALUMINUM ALLOYS

(75) Inventor: Leonard S. Aubrey, Hendersonville, NC (US)

(73) Assignee: Porvair PLC (GB)

( * ) Notice: Subject to any disclaimer, the term of this patent is extended or adjusted under 35 U.S.C. 154(b) by 266 days.

(21) Appl. No.: 12/999,121

(22) PCT Filed: Jun. 16, 2009

(86) PCT No.: PCT/US2009/047502
§ 371 (c)(1),
(2), (4) Date: Jan. 28, 2011

(87) PCT Pub. No.: WO2010/005716
PCT Pub. Date: Jan. 14, 2010

(65) Prior Publication Data
US 2011/0107875 A1    May 12, 2011

Related U.S. Application Data

(60) Provisional application No. 61/061,772, filed on Jun. 16, 2008.

(51) Int. Cl.
*B01D 39/20* (2006.01)
*B01D 35/00* (2006.01)

(52) U.S. Cl.
USPC .................................. 75/412; 210/500.26

(58) Field of Classification Search
USPC ............................... 210/500.26; 75/412
See application file for complete search history.

(56) References Cited

U.S. PATENT DOCUMENTS

| | | | |
|---|---|---|---|
| 3,947,363 A | 3/1976 | Pryor et al. | |
| 3,962,081 A | 6/1976 | Yarwood et al. | |
| 4,056,586 A * | 11/1977 | Pryor et al. | 264/44 |
| 4,343,704 A | 8/1982 | Brockmeyer | |
| 4,610,832 A | 9/1986 | Brockmeyer | |
| 5,673,902 A * | 10/1997 | Aubrey et al. | 266/229 |

OTHER PUBLICATIONS

International Search Report and Written Opinion, PCT/US2009/047502, Jan. 20, 2010, Koo Kwan Kang.

* cited by examiner

*Primary Examiner* — George Wyszomierski
*Assistant Examiner* — Tima M McGuthry Banks
(74) *Attorney, Agent, or Firm* — Joseph T. Guy; Perkins Law Firm, LLC

(57) ABSTRACT

A method for filtering molten aluminum and aluminum alloys. The method includes providing a reticulated foam wherein oxygen is introduced to an interior of the reticulated foam. Molten aluminum or aluminum alloy is passed through the reticulated foam wherein oxygen is maintained at a partial pressure of at least $2.51 \times 10^{-35}$ atm during filtration.

14 Claims, 5 Drawing Sheets

METHOD FOR FILTERING MOLTEN ALUMINUM AND MOLTEN ALUMINUM ALLOYS

CROSS-REFERENCE TO RELATED APPLICATIONS

This application claims priority to pending U.S. Provisional Patent Application No. 61/061,772 filed Jun. 16, 2008.

BACKGROUND

The present invention is related to a method of filtering molten aluminum and aluminum alloys. More specifically the present invention is related to a method for filtering molten aluminum and aluminum alloys comprising maintaining a partial pressure of oxygen within the interstitial spaces of the filter to mitigate reactivity between the oxides making up the ceramic filter and aluminum or aluminum alloys.

Filtration of molten metals is a common practice in industry. In particular, filtration of molten aluminum using reticulated foam filters is widely practiced in the art. It is well known that the refractory and chemical stability of the filter material is of critical importance in obtaining effective inclusion particle retention and to avoid release of reaction products from the filter material into the molten metal as a contaminant.

Reticulated foam filters using alumina aggregate grain in a binder phase have been commonly used for filtering aluminum and aluminum alloys. Aluminum orthophosphate has been widely practiced as exemplified in U.S. Pat. Nos. 3,947,363; 3,962,081 and 4,343,704. Unfortunately, it is widely realized in the art that aluminum phosphate has poor resistance to chemical attack, particularly, when used with magnesium containing aluminum alloys. During use the magnesium corrodes the intergranular areas causing a softening and release of alumina grain as inclusion material. Softening is known to compromise the strength of the reticulated foam structure. Yet another problem with aluminum orthophosphate based filters is the potential environmental issues resulting from formation of phosphine gas from the spent filter.

High purity sinter bonded alumina filters using an alumina hydrate bonding system are also well known as exemplified in U.S. Pat. No. 4,610,832. These filters exhibit excellent chemical resistance to attack from magnesium, but the expensive reactive grade alumina coupled with the high sintering temperatures eliminates these filters from being financially feasible for use in many processes.

In addition to the aforementioned issues, alumina filters, both phosphate bonded and sinter bonded, suffer from poor thermal properties due to their high thermal expansion and compressive modulus.

It would be desirable to use silica as a refractory foam material, as it tends to be inexpensive, easily processed. Silica also has a low thermal expansion and compressive modulus. Unfortunately, it is known to be highly reactive in molten aluminum alloys, especially in magnesium containing alloys.

An Ellingham free-energy diagram is illustrated in FIG. 1 wherein provided is the free energy of oxide formation as a function of temperature. Aluminum and magnesium are well below that of silicon. Therefore, the presence of unprotected silica in either the grain material or binder phase of a reticulated foam filter would be readily attacked by aluminum or magnesium. It is widely understood in the art that silica is to be avoided for use when filtering molten aluminum, magnesium or alloys thereof. Exclusion of silica is most unfortunate due to the low raw material cost and the improved thermal and mechanical properties. Silica containing materials have relatively low thermal expansion and compressive modulus. Silica is widely available in materials including mullite, kyanite, fused silica, calcium silicate, magnesium silicate, cordierite, and lithium aluminum silicates.

Boron glass can be used to improve the corrosion resistance of filter materials containing silica-rich aggregate grain materials. Under standard conditions of use in typical industrial aluminum filtration operations there is still some degree of attack, particularly, with magnesium-alloy containing materials.

There has been a long standing desire for a refractory material which is relatively inexpensive, robust under filtering conditions, non-reactive and which can be used for a wide variety of aluminum alloys including, especially, those containing magnesium. The present invention provides a method for filtering molten aluminum and alloys thereof which meets the long-standing desire in the art.

SUMMARY OF THE INVENTION

It is an object of the present invention to provide an improved method for filtering molten aluminum and aluminum alloys.

It is another object of the present invention to provide a method for filtering molten aluminum and aluminum alloys while minimizing reactivity between the molten metal and the filter material.

A particular advantage of the present invention is the ability to filter molten aluminum and aluminum alloys with reticulated filters comprising silica while mitigating reaction between the silica and components of the molten aluminum or alloy.

These and other advantages, as will be realized, are provided in a method for filtering molten aluminum and aluminum alloys. The method includes providing a reticulated foam wherein oxygen is introduced to an interior of the reticulated foam.

Molten aluminum or aluminum alloy is passed through said reticulated foam wherein oxygen is maintained at a partial pressure of at least $2.51 \times 10^{-35}$ atm during filtration.

Yet another advantage is provided in a reticulated filter system. The system has an aggregate phase and a binder phase wherein at least one of the aggregate phase and the binder phase has silica. A partial pressure of oxygen is providing in the reticulated filter at elevated temperature during filtration.

DETAILED DESCRIPTION

The present invention provides a method for filtering molten aluminum and aluminum alloys wherein reaction between the filter material and the molten metal are avoided. In particular, the present invention allows the use of materials previously thought to be unavailable for use with aluminum thereby allowing for the formation of filters which are more physically robust and which can be manufactured at a lower cost.

Figure 1:
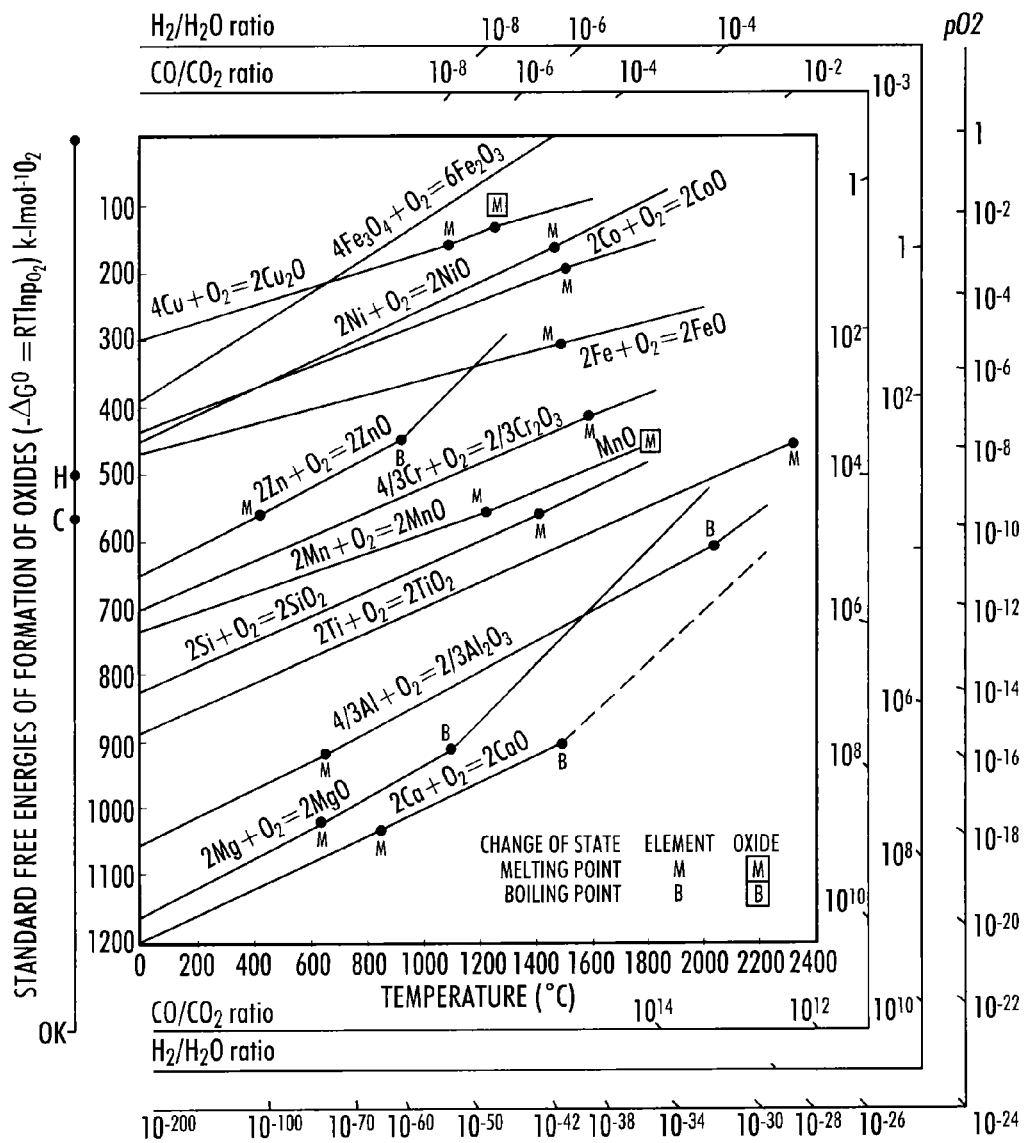
FIG. 1 is a graphical representation of the Ellingham free energy of formation of oxides for various materials.
Figure 2:
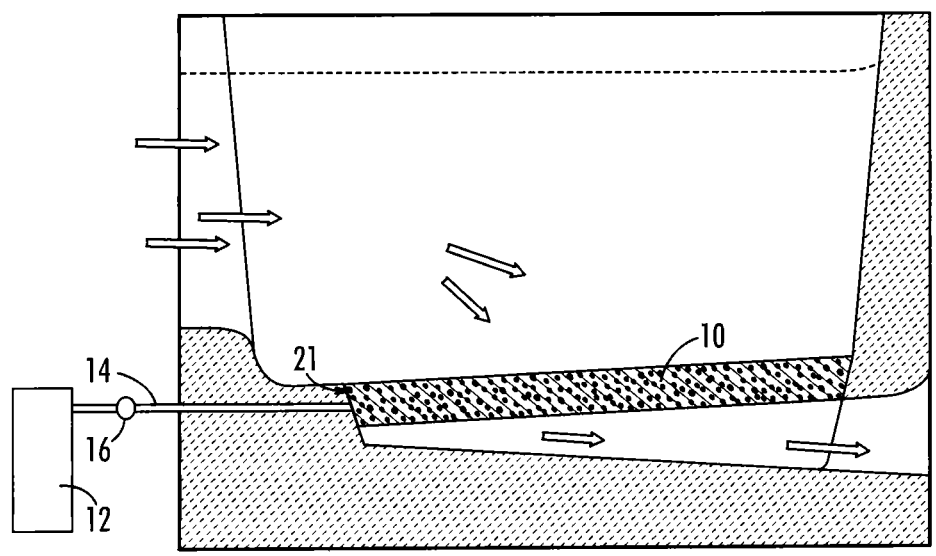
FIG. 2 is a schematic representation of an embodiment of the present invention.

An embodiment of the present invention is illustrated in cross-sectional schematic view in FIG. 2. In FIG. 2, the reticulated foam filter is illustrated schematically at 10. An oxygen source, 12, is attached to the reticulated foam filter by tubing, 14, which preferably includes at least one valve, 16. While illustrated as a single oxygen source and tubing it would be understood that multiple oxygen sources could be attached through a manifold as typically implemented in the art. Additional gas sources may be employed as further described herein. It is preferable that the interstitial space of the filter be homogeneously supplied with oxygen. To insure adequate gas permeation within the skeletal porosity of the filter it is highly preferable to provide a micro-porous gasket materials to seal the tube to the filter. The tube is inserted into the porous gasket material, 21. The oxygen then flows through the micro-porous gasket material and into the skeletal porosity of the filter. Particularly suitable gasket material include commercially available materials such as Safeseal® or Sealsafe® or a porous fiber paper such as Fiberfrax®, Isofrax®, Superwool®, SF607® or Insulfrax®. In one embodiment the filter edge is saw cut to open the skeletal porosity in contact with the compressible gasket material in order to facilitate flow of oxygen from the porous gasket material into the skeletal porosity of the filter.

Reticulated foam filters are known to typically include an aggregate grain material in a binder. In a preferred embodiment the reticulated foam filter preferably comprises silica in at least one of the bonding phase and the aggregate grain material. This was previously considered impossible for use in aluminum or aluminum alloy filtration due to the reactivity of silica as indicated previously.

Figure 3:
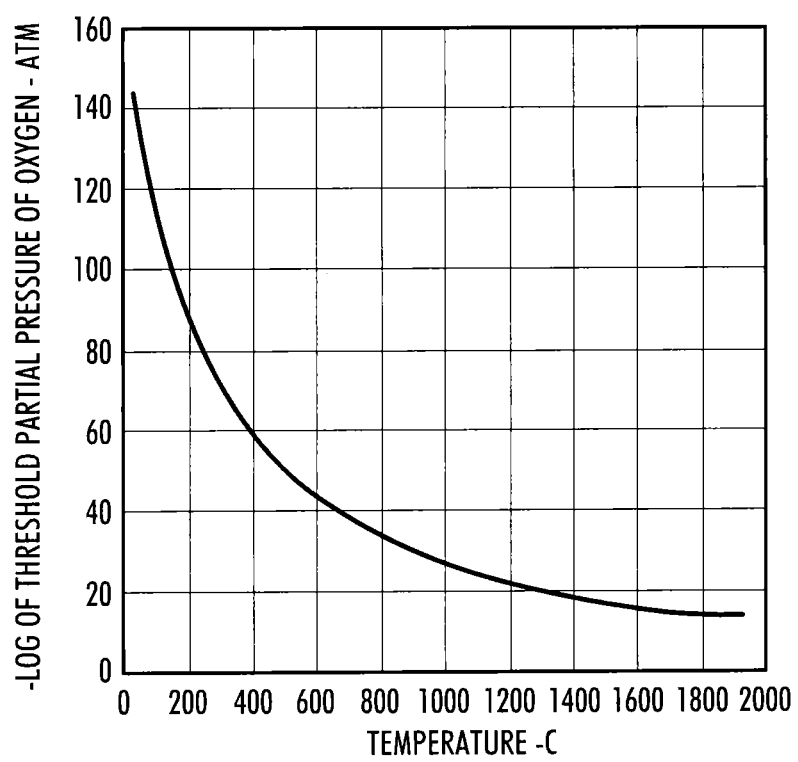
FIG. 3 is a graphical representation of the threshold partial pressure of oxygen for the equilibrium reaction of silicon dioxide formation from silicon and oxygen.

While not restricted to any theory, the reactivity of oxide materials can be suppressed or modified by maintaining a critical oxygen pressure at the oxide-metal interface. A computed threshold oxygen pressure for reaction equilibrium between the $Si/O_2$ and $SiO_2$ is illustrated in FIG. 3 as obtained from San Jose State University, Ellington Web Tool (www.engr.sjsu.edu/ellingham). If the oxygen pressure is maintained above a critical value the chemical reduction of silica can be effectively suppressed. By way of example, at about 727° C. an oxygen partial pressure of about $2.51 \times 10^{-37}$ is required to suppress silica reduction.

The oxygen source is selected for convenience and accurate control. Pure oxygen is most preferred from a chemical reactivity perspective, however, maintaining such a low level of oxygen with any level of precision is challenging. In practice oxygen is preferably provided as a mixture with a carrier gas, which is inert to the filter and molten metal at filtration temperature. Particularly preferred carrier gases include nitrogen, argon and helium with nitrogen being most preferred due to cost considerations.

The oxygen partial pressure is preferably maintained at, at least, $2.51 \times 10^{-35}$ atm during filtration. To insure adequate oxygen it is preferable to maintain a partial pressure of at least $3 \times 10^{-35}$ atm thereby mitigating the presence of local areas which are oxygen deficient. Above about $1 \times 10^{-34}$ atm there is no added benefit and oxide formation can occur if the oxygen level is maintained at a level which is well above that necessary for the purposed described herein.

In another embodiment additional gases are included to facilitate metal purification. A particularly preferred gas is chlorine gas, which reacts with solubilized impurities, such as alkali earths, to form chloride salts. The chloride salts precipitate and are removed by filtration. Calcium, lithium and sodium are particularly common impurities and each can be removed by introducing chlorine gas into the molten metal, and particularly, into the interstitial area of the reticulated filter.

A particular problem associated with aluminum filtration is the presence of hydrogen. Hydrogen atoms can be caused to diffuse into the reticulated filter and react therein to form hydrogen gas. Methods of removing hydrogen are described, particularly, in U.S. Pat. Publ. No. 2006/0125160.

Figure 4:
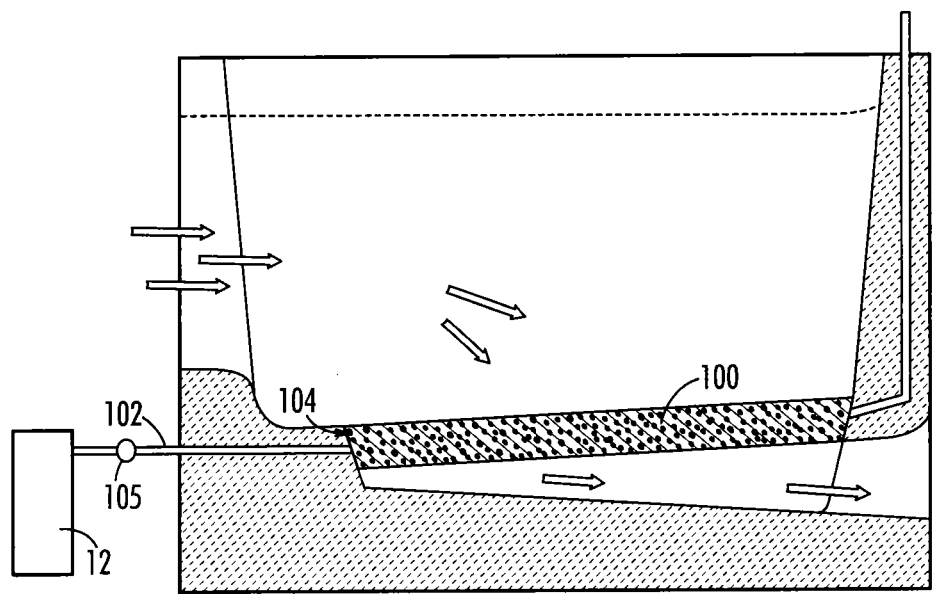
FIG. 4 is a schematic representation of an embodiment of the present invention.

An embodiment of the present invention is illustrated schematically in FIG. 4, wherein the reticulated filter, generally represented at 100, is shown in cross-sectional view. The reticulated filter, 100, comprises at least one interface tube, 102. An interfaced gasket, 104, is provided to allow entry of the gas into the skeletal porosity of the filter. The interface tube, 102, provides oxygen, preferably with a carrier gas. The second interface tube, 121, is used as a vent. A regulator, 105, may be used to control internal pressure and therefore partial pressure of oxygen. In an alternative embodiment oxygen, and optional carrier gas, can be introduced in one interface tube and oxygen, any carrier gas, and hydrogen are exhausted from a subsequent interface tube. The exhaust can be with vacuum assist if desired.

In one embodiment the interface tubes may be in flow communication with an internal cavity. This is not preferred in a filter due to the loss of strength associated with cavity formation.

The interface tubes are non-porous, preferably metal or dense ceramic such as graphite, boron nitride, alumina, zirconia or mullite. Preferably, the interface tubes could be constructed of steel austenitic stainless steel or Inconel.

While not limited to any theory, the function of the interface tubes is to provide a partial pressure of oxygen in the interstitial space. This can be done at static, or near static, pressure or as a continuous flow of gas into the interstitial spaces of the reticulated filter. The flowing gas maintains optimal partial pressure of oxygen and preferably continuously removes hydrogen gas. By continuously removing the hydrogen gas, a high driving force is maintained for the diffusion of hydrogen atoms into the plate. Either a purge or a vacuum removes the hydrogen by the same basic mechanism based on the partial pressure of hydrogen in the plate relative to the molten metal.

The presence of hydrogen in a carrier gas, particularly argon, has a significant impact on the thermal conductivity of the carrier gas. This change in thermal conductivity can be measured and quantified using commercial thermal conductivity analyzers. By measuring the purging gas flow rate and the % hydrogen gas in the argon, based on the conductivity, the performance of the filter as a degasser can be measured in real-time and the performance optimized with regards to flow rates and volumes of purge air. Due to the enhanced ability to monitor efficiency a purge system is preferred over a vacuum system.

The filter is preferably made via the foam replication technique, which is a common method used to manufacture reticulated ceramic foam for use as molten metal filtration devices. In forming the filters a foam, and most preferably polyurethane foam, is coated with ceramic slurry, then dried and fired. During firing, the polyurethane foam within the ceramic coating vaporizes but the ceramic structure remains resulting in an exoskeleton-like ceramic foam having hollow voids where the polyurethane once resided. The structure is essentially a connection of struts with porosity residing around and within these struts. The process for forming a ceramic filter is provided in U.S. Pat. Nos. 4,056,586; 5,456,833 and 5,673,902 each of which are incorporated herein by reference.

The slurry employed depends on the desired ceramic material for the chosen application. One must have sufficient properties in the final product to withstand the particular application and must have sufficient structural and/or mechanical strength to stand up to the particular elevated temperature conditions. In addition, the slurry preferably has a relatively high degree of fluidity and most preferably is comprised of an aqueous suspension of the ceramic intended for use in the filter. Normally, the slurry contains water. Additives, such as binders and surfactants, may be employed in the slurry.

The flexible foam material is impregnated with the aqueous ceramic slurry so that the fiber-like webs are coated therewith and the voids are filled therewith. Normally, it is preferred to repeatedly immerse the foam in the slurry and compress the foam between immersions to insure complete impregnation of the foam.

The impregnated foam is preferably compressed to expel from 25 to 75% of the slurry while leaving the fiber-like web portion coated therewith. In a continuous operation, one may pass the impregnated foam through a preset roller to affect the desired expulsion of slurry from the foam and leave the desired amount impregnated therein. This may be done manually by simply squeezing the flexible foam material to the desired extent. At this stage, the foam is still flexible and may be formed into configurations suitable for the specific filtration task, i.e., into curved plates, hollow cylinders, etc. It is necessary to hold the formed foam in position by conventional means until the polymeric substrate is decomposed, or preferably until the ceramic is sintered. The impregnated foam is then dried by either air drying or accelerated drying at a temperature of from 35° to 700° C. for from 2 minutes to 6 hours. After drying, the material is heated at an elevated temperature to bond the ceramic particles making up the fiber-like webs. It is preferred to heat the dried impregnated material in two stages, with the first stage being to heat to a temperature of from 350° to 700° C. and holding within this temperature range for from 2 minutes to 6 hours in order to burn off or volatilize the web of flexible foam. Clearly this step can be part of the drying cycle, if desired. The second stage is to heat to a temperature of from 900° to 1700° C. and hold within that temperature range for from 2 minutes to 10 hours in order to bond the ceramic. The resulting product is a fused ceramic foam having an open cell structure characterized by a plurality of interconnected voids surrounded by a web of the ceramic. The ceramic foam may have any desired configuration based on the configuration needed for the particular molten metal filtration process.

The process for forming the filter comprises forming a slurry of ceramic precursors. For the purposes of the present invention ceramic precursors may comprise aluminosilicate, colloidal silica, fumed silica, fused silica, or modified bentonite. The slurry may comprise a surfactant to decrease the surface tension of the aqueous phase for improved wetting characteristics.

The term "refractory aluminosilicate" as used herein refers to refractory raw materials that comprise predominantly mullite and which possess a pyrometric cone equivalent (PCE) of at least 20. This class of raw materials is also known in the refractory materials literature by the synonyms calcined fireclay, calcined aggregate, refractory calcines, mullite calcines, refractory aggregates, calcined kyanite, electrofused mullite and chamottes.

The ceramic precursor of the present invention preferably comprises 40-60% inexpensive ceramic grain material such as aluminosilicate, examples of which are mullite or kyanite, 0-20% inorganic binder that fluxes at low temperature and binds the ceramic grain material, examples include fine clay or colloidal silica, 0-20% fine ceramic material to aid in flow properties of the ceramic slurry, examples include silica fume, finely ground mullite, or finely ground kyanite, 0-20% water to achieve the desired slurry rheological flow characteristics, and 0-1% dispersing aids such as ammonium polyacrylate.

The density of the resulting filter is preferably at least about 8 wt % of theoretical density to no more than about 18 wt % of theoretical density. Above about 18 wt% of theoretical density the filtering rate is too slow to be effective. Below about 8 wt % of theoretical density the strength of the filter is insufficient for use in filtering molten aluminum. Theoretical density is a common term of art wherein density is reported as a percentage of the theoretical density of the ceramic material assuming no voids.

Refractory aluminosilicate is a naturally occurring material with a nominal composition of $3Al_2O_3.2SiO_2$. In practice refractory aluminosilicate comprises from about 45 wt % to 70 wt % $Al_2O_3$ and about 25 wt % to about 50 wt % $SiO_2$. Naturally occurring impurities are present and one of skill in the art would realize that completely removing the impurities is cost prohibitive. In practice, refractory aluminosilicate has about 1.5-3 wt % $TiO_2$, up to about 1.5 wt % $Fe_2O_3$, up to about 0.06 wt % CaO, up to about 0.8 wt % MgO, up to about 0.09 wt % Na2O, up to about 0.9 wt % K2O and up to about 0.12 wt % $P_2O_5$. For the purposes of the present invention the preferred refractory aluminosilicate is Virginia Kyanite—325 mesh available from Kyanite Mining Company in Dillwyn, Va., but any commercially available refractory aluminosilicate powder is suitable to the application.

It is preferable to add volatile organic materials into the ceramic slurry to further increase the porosity.

In an alternative embodiment a ceramic precursor comprising spherically shaped voids therein can be formed into the desired shape of the porous ceramic and fired as described in U.S. Pat. No. 6,773,825, which is incorporated herein by reference thereto.

A mixture of ceramic or metal particles and pliable organic spheres as the pore former is prepared into a liquid, or suspension, and the mixture is formed into a shaped article. The shaped article is dried and fired so that the particles are bonded by sintering. The organic spheres and other organic additives are volatilized. The spheres are preferably low density and more preferably hollow. The size of the voids may be preselected by selecting the appropriate polymer spheres. The porosity is also easily controlled by the number of polymer spheres added. It is most preferred that the polymer spheres are each in contact with at least two other spheres such that a network of voids is created in the eventual diffuser.

To a suspension of ceramic precursor is added pliable organic hollow spheres, which are simultaneously suspended in the solvent as a pore former. The ceramic precursor is then incorporated into the foam as described further herein and dried to remove the solvent. When the ceramic precursor is fired to form a ceramic the spheres are volatilized resulting in uniformly distributed voids throughout the filter lattice. Using this method a range of porosities can be achieved, however, for use in molten aluminum filtration it is preferable that the porosity be no more than 60% due to insufficient thermal stress resistance at higher levels of porosity. The porosity and pore size is easily controlled by the number and sizes of polymer spheres used. After firing the void is substantially the same shape and size as the included sphere. It is most preferably to utilize spheres with an average diameter of 20 to 150 microns and more preferably 20-80 microns. An 80 micro sphere is most preferred. Other organic pore formers may be included including flour, cellulose, starch and the like. Hollow organic spheres are most preferred due to the low volume of organic to pore volume, which can be achieved and the minimal level of organic residue remaining after firing. It is most preferred that the slurry comprise up to about 10 wt % pore formers based on an 80 micron hollow sphere.

The material is either formed to size or cut to size. The material can be cut to size as a green ceramic or as a sintered ceramic.

Figure 5:
FIG. 5 is a photograph of a prior art filter after use.

FIG. 5 is a photograph illustrating a used silica-containing filter bonded with a borosilicate glass. The filter was subjected to corrosion testing in a magnesium-containing aluminum alloy where no oxygen introduced thereby representing reducing conditions. The filter material has turned black indicating reaction with the molten alloy. Furthermore, wetting is indicated by the infiltration of metal into the filter exoskeleton. The test was conducted for 2 hours at 750° C. in 4.7% magnesium-aluminum alloy.

Figure 6:
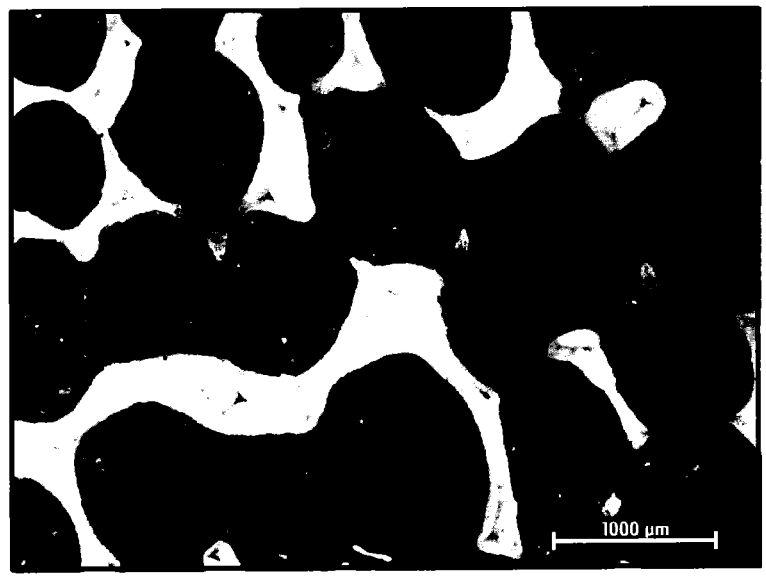
FIG. 6 is a photograph of an inventive filter after use.

FIG. 6 illustrates an inventive example subjected to the same conditions as above except that a small partial pressure of oxygen was maintained during the test. The filter has not reacted and the filter exoskeleton does not exhibit penetration or wetting by the molten alloy.

The present invention has been described with particular reference to the preferred embodiments, which are intended to be illustrative, but are not considered to be limiting. Other configurations, alterations and embodiments could be realized from the teachings herein without departing from the scope of the invention, which is set forth more clearly in the claims appended hereto.

The invention claimed is:

1. A reticulated filter system comprising:
an aggregate phase and a binder phase wherein at least one of said aggregate phase and said binder phase comprise silica;
a source for providing a partial pressure of oxygen in said reticulated filter at elevated temperature wherein said partial pressure of oxygen is no more than $1\times10^{-34}$ atm.

2. The reticulated filter system of claim 1 wherein said elevated temperature is a filtration temperature for molten aluminum or molten aluminum alloy.

3. The reticulated filter system of claim 1 further comprising providing chlorine to an interior of said reticulated foam.

4. A reticulated filter system comprising:
an aggregate phase and a binder phase wherein at least one of said aggregate phase and said binder phase comprise silica;
a source for providing a partial pressure of oxygen in said reticulated filter at elevated temperature wherein said source is a gas introduced into said reticulated filter wherein said gas comprises a carrier gas.

5. The reticulated filter system of claim 4 wherein said gas is provided from an external source.

6. The reticulated filter system of claim 5 wherein said reticulated foam comprises an interface tube in flow communication with said external source.

7. The reticulated filter system of claim 6 wherein said interface tube is in flow communication with an internal chamber.

8. The reticulated filter system of claim 4 wherein said carrier gas is selected from nitrogen, argon, and helium.

9. A reticulated filter system comprising:
an aggregate phase and a binder phase wherein at least one of said aggregate phase and said binder phase comprise silica;
a source for providing a partial pressure of oxygen in said reticulated filter at elevated temperature wherein said source is a gas introduced into said reticulated filter;
wherein said gas is provided from an external source;
wherein said reticulated foam comprises an interface tube in flow communication with said external source and
wherein said reticulated foam further comprises a second interface tube.

10. The reticulated filter system of claim 9 further comprising a vacuum source in flow communication with said second interface tube.

11. A reticulated filter system comprising:
an aggregate phase and a binder phase wherein at least one of said aggregate phase and said binder phase comprise silica;
a source for providing a partial pressure of oxygen in said reticulated filter at elevated temperature
further comprising a gasket wherein said gasket is in contact with said reticulated filter.

12. The reticulated filter system of claim 11 wherein said gasket is selected from a porous gasket and a permeable gasket.

13. The reticulated filter system of claim 11 wherein said gasket is a refractory fiber gasket.

14. The reticulated filter system of claim 11 wherein said gasket is a compressible gasket.

* * * * *